(12) United States Patent
Bowles et al.

(10) Patent No.: US 10,606,305 B2
(45) Date of Patent: Mar. 31, 2020

(54) PROCESSOR LOAD STEP BALANCING

(71) Applicant: QUALCOMM Incorporated, San Diego, CA (US)

(72) Inventors: Kevin Bowles, Mission Viejo, CA (US); Anish Muttreja, Denver, CO (US); Ravi Jenkal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 116 days.

(21) Appl. No.: 15/967,456

(22) Filed: Apr. 30, 2018

(65) Prior Publication Data

US 2019/0332138 A1 Oct. 31, 2019

(51) Int. Cl.
*G06F 1/08* (2006.01)
*G06F 1/06* (2006.01)
*G06F 1/12* (2006.01)
*G06F 1/30* (2006.01)

(52) U.S. Cl.
CPC ............... *G06F 1/08* (2013.01); *G06F 1/06* (2013.01); *G06F 1/12* (2013.01); *G06F 1/30* (2013.01)

(58) Field of Classification Search
CPC ..... G06F 1/08; G06F 1/06; G06F 1/12; G06F 1/30
See application file for complete search history.

(56) References Cited

U.S. PATENT DOCUMENTS

| | | | | |
|---|---|---|---|---|
| 8,037,340 B2* | 10/2011 | Kim | ............ | G06F 1/08 713/503 |
| 8,866,520 B1 | 10/2014 | Pham et al. | | |
| 9,098,260 B2* | 8/2015 | Martin | ............ | G06F 1/28 |
| 9,182,803 B2* | 11/2015 | Naffziger | ............ | G06F 1/3203 |
| 9,223,383 B2 | 12/2015 | Manne et al. | | |
| 9,450,590 B2 | 9/2016 | Dobbs et al. | | |
| 9,778,676 B2 | 10/2017 | Pal et al. | | |
| 9,813,229 B2 | 11/2017 | Saban et al. | | |
| 2010/0058086 A1* | 3/2010 | Lee | ............ | G06F 1/3203 713/322 |
| 2017/0329391 A1 | 11/2017 | Jaffari et al. | | |

FOREIGN PATENT DOCUMENTS

| WO | 2012168533 A1 | 12/2012 |
|---|---|---|
| WO | 2017023472 A1 | 2/2017 |

OTHER PUBLICATIONS

International Search Report and Written Opinion—PCT/US2019/022405—ISA/EPO—dated Jun. 25, 2019.

* cited by examiner

*Primary Examiner* — Stefan Stoynov (74) *Attorney, Agent, or Firm* — Haynes and Boone, LLP (36340)

(57) ABSTRACT

A system is provided that controls the clocking of a processor depending upon its usage of execution units. As the processor transitions from a default mode of operation using a default number of the execution units to an increased load mode of operation using an increased number of the execution units, a current drawn by the processor from a power rail remains substantially unchanged.

15 Claims, 6 Drawing Sheets

| Step Down Target | Time Interval Count back to 100% | Cycle Counts Per Time Period During Transition | Total Cycles |
|---|---|---|---|
| 80% | 2 | 10,11 | 21 |
| 66.7% | 3 | 9,10,11 | 30 |
| 50% | 5 | 7,8,9,10,11 | 45 |
| 40% | 6 | 6,7,8,9,10,11 | 51 |
| 33.3% | 7 | 5,6,7,8,9,10,11 | 56 |
| 25% | 8 | 4,5,6,7,8,9,10,11 | 60 |
| 16.7% | 9 | 3,4,5,6,7,8,9,10,11 | 63 |

PROCESSOR LOAD STEP BALANCING

TECHNICAL FIELD

This application relates to processors, and more particularly to the load step balancing of a processor clock frequency in response to changes in processor load.

BACKGROUND

The amount of processing performed per clock cycle by a processor is subject to change as the associated computations become more intensive. During low load periods, relatively few execution units such as multiply-and-accumulate (MAC) units are active in each processor clock cycle. But in response to sudden load changes, the number of active execution units may increase dramatically. The current demanded by the processor from its power supply rail will thus change in concert with the change in processing load. The resulting increase in current demand by the processor may cause its power supply voltage to droop undesirably, resulting in fault conditions.

It is thus conventional to lower a processor's clock frequency during periods of increased processing demand. For example, the clock frequency may be halved during such increased load periods. But lowering the clock frequency by too much results in the power supply voltage increasing undesirably, which leads to fault conditions such as hold violations. Conversely, lowering the clock frequency by too little results in low voltage fault conditions. Prior art load balancing techniques thus wavered between power distribution network (PDN) fault conditions resulting from too-high of a power supply voltage and fault conditions resulting from too-low of a power supply voltage.

Accordingly, there is a need in the art for improved load step balancing of the processor clock frequency in response to processor load increases.

SUMMARY

To minimize PDN noise, the processor clock frequency is decreased proportionally to a processor load increase. To quantify the load increase, a default number of execution units that are active while the a processor operates in a default mode of operation are determined. The default mode of operation corresponds to a low load state. During a transition from the default mode of operation to an increased load mode of operation in which the processor operates in an increased load mode of operation, the number of active execution units is increased by a multiple greater than one of the default number. During this transition, the processor clock frequency is decreased so as to be inversely proportional to the multiple of the default number of active execution units. Because of this proportionality, a current drawn by the processor from a power rail does not significantly change while the processor transitions from the default mode of operation to the increased load mode of operation. A power supply regulating a power supply voltage carried on the power rail may thus keep the power supply voltage from undershooting or overshooting a desired value despite the sudden increase in load for the processor.

These and other advantageous features may be better appreciated through the following detailed description.

BRIEF DESCRIPTION OF THE DRAWINGS

Implementations of the present disclosure and their advantages are best understood by referring to the detailed description that follows. It should be appreciated that like reference numerals are used to identify like elements illustrated in one or more of the figures.

DETAILED DESCRIPTION

Figure 1:
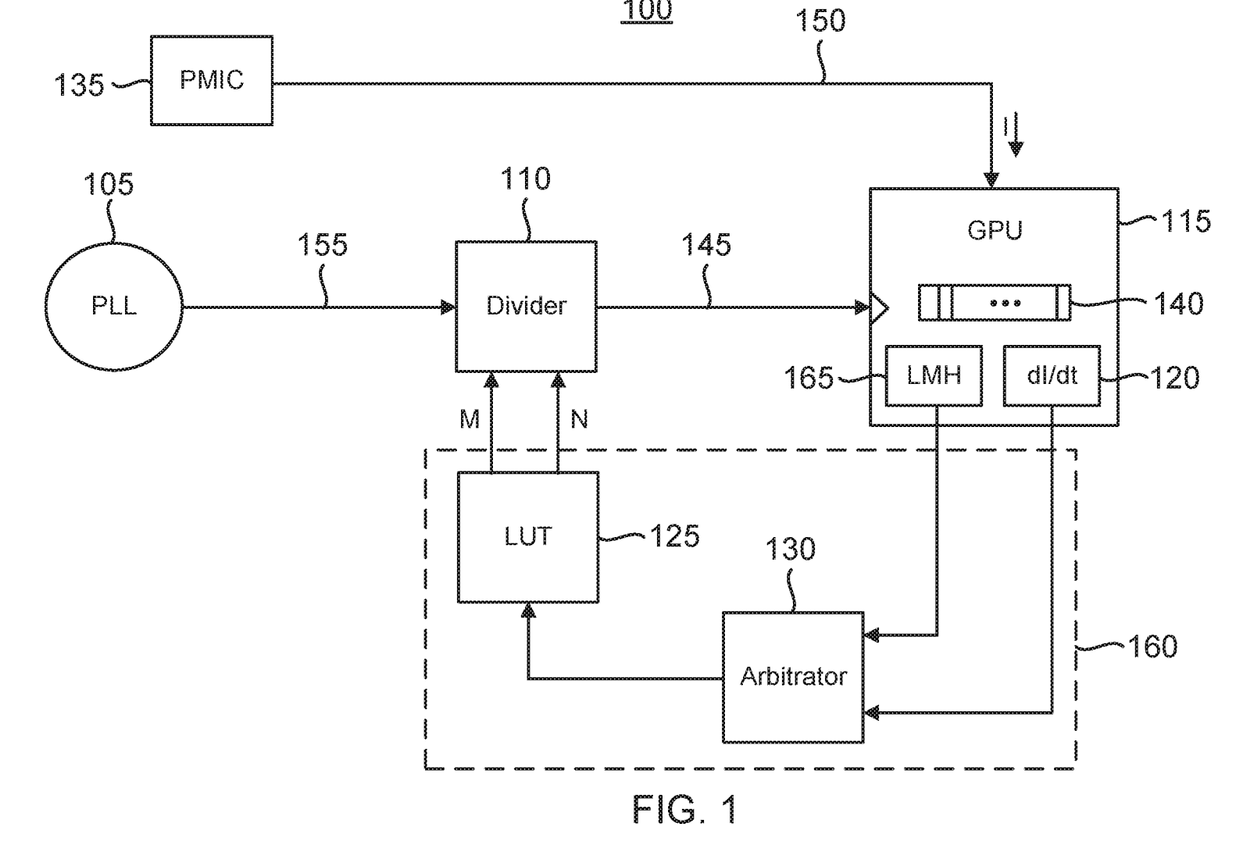
FIG. 1 is a diagram of a processor system configured for load step balancing in accordance with an aspect of the disclosure.

Turning now to the drawings, FIG. 1 illustrates a system 100 configured for load step balancing as disclosed herein. In one implementation, system 100 may comprise a system-on-a-chip (SoC) or another type of suitable integrated circuits. A processor such as a graphics processing unit (GPU) 115 includes a plurality of execution units 140. It will be appreciated, however, that the load balancing technique disclosed herein is widely applicable to other types of processors such as general purpose central processing units (CPUs). As known in the processor arts, each active execution unit 140 is configured to execute instructions for a computer program for GPU 115. During a default load state or mode of operation (lowest load state) for GPU 115, only a default number of execution units 140 are active in each clock cycle of a processor clock signal 145. During this default load state, processor clock signal 145 cycles at a maximum frequency denoted herein as $F_{MAX}$. Based upon the default number of active execution units 140 and the clocking frequency of $F_{MAX}$, GPU 115 will draw a current I from a power rail 150. A power source such as power management integrated circuit (PMIC) 135 regulates power rail 150 to keep it charged to a desired power supply voltage for GPU 115. But the load for GPU 115 may suddenly increase such that the number of active execution units 140 in each clock cycle significantly increases over the default number that are active during the default load state. For example, should the number of active execution units 140 increase to four times the default number, GPU 115 will draw a current of approximately four times the default current I from power rail 150.

A power supply such as PMIC 135 cannot maintain the power supply voltage in the face of such a sudden increase in current demand. Processor system 100 is thus configured to practice an intelligent load balancing such that the processor clocking frequency is reduced proportionally to the load increase. In the following discussion, it will be assumed that each execution unit 140 is a multiply-and-accumulate (MAC) unit. However, it will be appreciated that other suitable units such as an arithmetic-logic unit (ALU) or a floating point unit (FPU) may form execution units 140 in alternative implementations. The average current $i_{avg}(t)$ drawn from power rail 150 during operation by GPU 115 at clock frequency of $f_{clk}$ then becomes:

$$i_{avg}(t)=\alpha N_{MAC}f_{clk}+\beta \qquad \text{Eq. (1)}$$

where $N_{MAC}$ is the number of active MAC units active in each clock cycle, $\alpha$ is a proportionality factor for the current demand for each active MAC unit that depends upon the MAC unit capacitance and the power supply voltage, and $\beta$ represents the dynamic leakage.

To establish load balance equality such that there is no change in the rate of current consumption dI/dt by GPU 115 despite the sudden increase in load, the starting current consumption in the default mode of operation ($I_{initial}(t)$) should equal the current consumption after the load step increase ($I_{step}(t)$). Substitution into Equation (1) for the initial and final currents before and after the load step increase leads to the following equality:

$$\alpha N_{initial}f_{MAX}+\beta=\alpha N_{final}f_{step}+\beta \qquad \text{Eq. (2)}$$

where $N_{initial}$ is the default number of active MAC units during default operation of GPU 115, $f_{MAX}$ is the default clock frequency, $N_{final}$ is the number of active MAC units after the load increase, and $f_{step}$ is the reduced processor clock frequency after the load step increase.

Solving for the reduced clock frequency $f_{step}$ of Equation (2) leads to the following expression:

$$f_{step}=f_{MAX}(N_{initial}/N_{final}) \qquad \text{Eq. (3)}$$

where $N_{final}$ equals $N_{initial}$ plus some additional number $\Delta n$ of active MAC units.

As implied by the suffix "MAX," the default clocking frequency $f_{MAX}$ is the maximum clocking frequency whereas the stepped clock frequency $f_{step}$ in response to the load increase is lower than $f_{MAX}$. By making the clocking frequency reduction proportional to the load increase as follows from Equation (3), system 100 ensures that the current consumption from the power rail 150 is effectively unchanged despite the sudden transition from the default mode of operation to an increased load mode of operation for GPU 115. The resulting reduction in clocking frequency is thus quite advantageous because the power supply voltage for GPU 115 will neither overshoot nor undershoot from its desired value despite the sudden processor load increase. Moreover, since the frequency decrease is proportional to the load increase, it doesn't matter if the load increase is very significant or merely significant because the frequency decrease is tailored to the load increase.

Another advantage of this frequency reduction is that a clock source such as a phase-locked loop (PLL) from which processor clock signal 145 is derived may remain locked despite the changes in clocking frequency. For example, a PLL 105 in system 100 drives a clock divider 110 with a source clock signal 155 that cycles at a multiple of $f_{MAX}$, e.g., two times $f_{MAX}$. Clock divider 110 divides source clock signal 155 to produce processor clock signal 145. This division may be approximated by a ratio (N/M) of integers N and M. The resulting clock division keeps certain edges of processor clock signal 145 synchronous with corresponding edges in source clock signal 155 so that PLL 105 may remain locked. For example, suppose the integer M equals 48. In that case, the following values of N in the following Table 1 may be used in clock divider 110 to produce the following reductions of clock frequency:

TABLE 1

| N | $N_{final}/N_{initial}$ | $f_{step}/f_{MAX}$ (%) |
|---|---|---|
| 24 | 1.00 | 100.0% |
| 19.2 | 1.25 | 80.0% |
| 16 | 1.5 | 66.7% |
| 12 | 2.00 | 50.0% |
| 9.6 | 2.5 | 40.0% |
| 8 | 3.00 | 33.3% |
| 6 | 4.00 | 25.0% |
| 4 | 6.00 | 16.7% |

Note the numerator N in the ratio N/M does not equal an integer when the clock frequency is reduced by 80% and also by 40% when M equals 48. However, for the remaining clock frequency reductions in response to load increases, N has an integer value. The percentages from Table 1 are plotted as a function of the execution unit ratio increase (Nfinal/Ninitial) in FIG. 2A. The decrease from one frequency step to the next becomes asymptotically less with each increase in execution unit usage. For example, a doubling of execution unit usage from the default demand usage leads to a reduction of clocking frequency by 50% whereas a six-fold increase in demand from the default mode of operation leads to a reduction of clocking frequency of just 16.7%. Although there is only one processor clock signal 145, the clocking of GPU 115 at the 100% frequency of Fmax may be deemed to be clocking of GPU 115 by a first processor clock signal. Similarly, the clocking of GPU 115 at the 80% frequency may be deemed to be a clocking of GPU 115 by a second processor clock signal, and so on for the remaining clock frequency percentages.

Figure 2A:
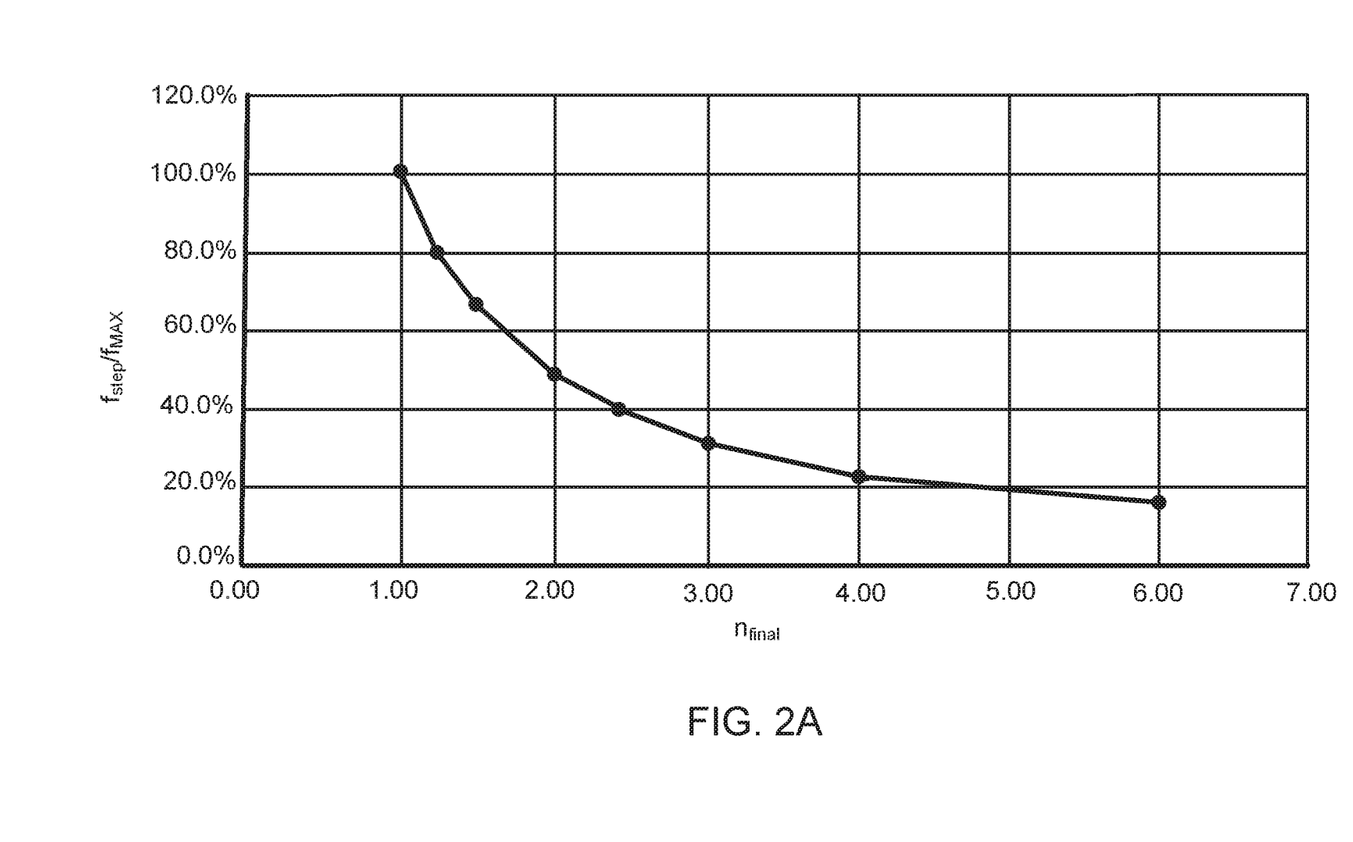
FIG. 2A is a plot of the processor clocking frequency reductions to provide load step balancing as a function of the load demand increase in accordance with an aspect of the disclosure.
Figure 2B:
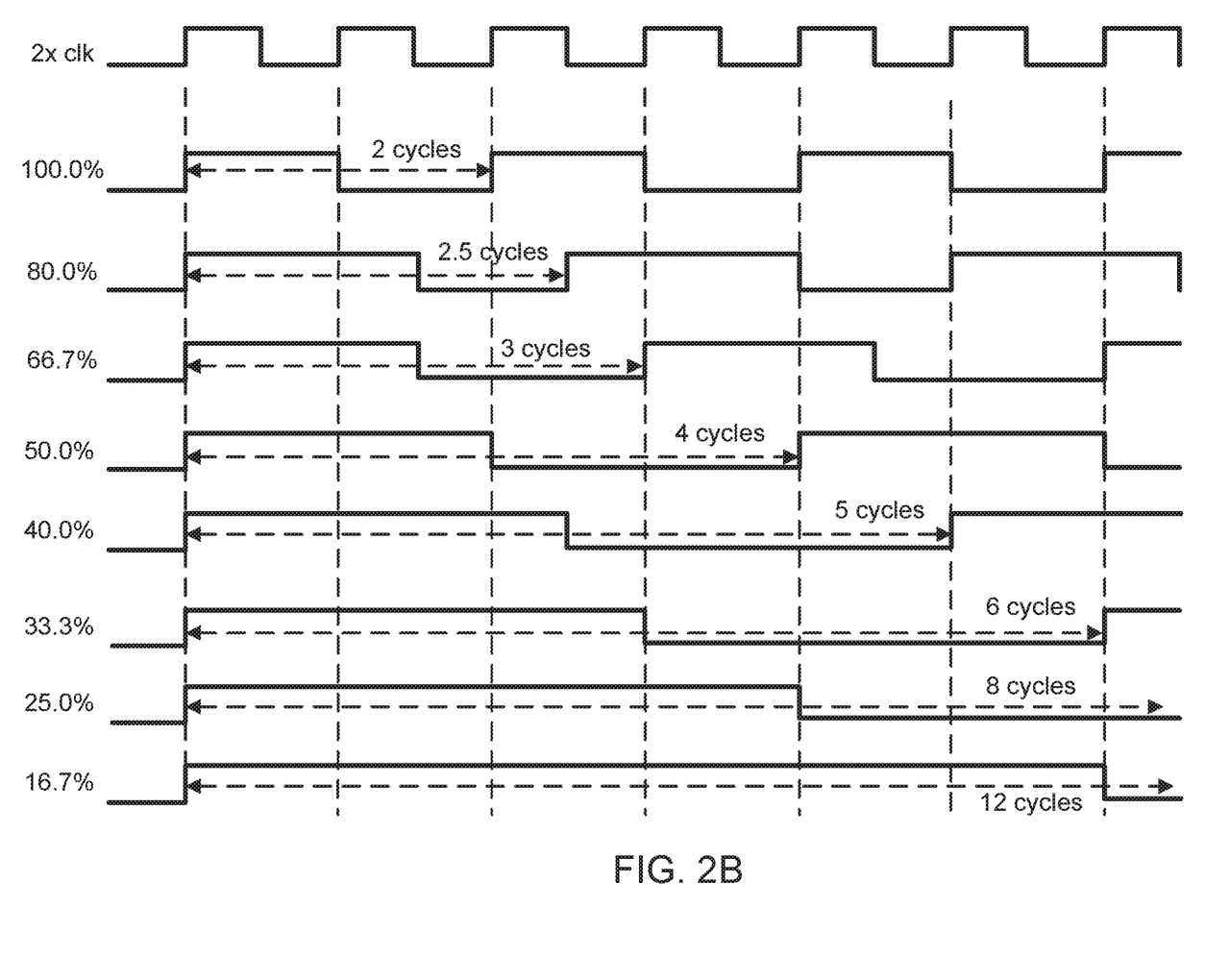
FIG. 2B illustrates waveforms for the reduced clocking frequencies of FIG. 2A and also the source clock signal waveform.

Waveforms for the resulting processor clock signals 145 based upon an appropriate selection of edges from source clock signal 155 are shown in FIG. 2B. For example, to produce the 100% clock signal having the $F_{MAX}$ frequency for clocking GPU 115 during its default operation, clock divider 110 (FIG. 1) may respond to the rising edges of source clock signal 155 to produce corresponding rising and falling edges of the 100% clock signal. In particular, the rising edges for source clock signal 155 may be divided into even and odd rising edges. A first rising edge, a third rising edge, and so on form a set of odd rising edges whereas a second rising edge, a fourth rising edge, and so on form a set of even rising edges. Clock divider 110 produces a rising edge in the 100% clock signal responsive to the odd rising edges and produces a falling edge in the 100% clock signal responsive to the even rising edges. It will be appreciated that clock divider 110 may instead be configured to respond to falling edges in source clock signal 155. The resulting duty cycle for the 100% clock signal is 50-50. Note that PLL 105 may advantageously remain locked while clock divider 110 divides source clock signal 155 into the 100% form of processor clock signal 145 since clock divider 110 is responding to edges in source clock signal 155 to produce corresponding edges in processor clock signal 145.

The division by clock divider 110 to form the reduced frequencies for processor clock signal 145 is analogous to the division for forming the 100% clock signal. For example, to divide source clock signal 155 to the 80% clock frequency, clock divider 110 responds to a first rising edge of source clock signal 155 to produce a first rising edge of processor clock signal 145 having the 80% clock frequency. To achieve a frequency of 80% of the period of the 100% frequency, clock divider 110 responds to a falling edge of source clock signal 155 that occurs 2.5 clock cycles after its initial rising edge. Given this period for the 80% clock frequency equaling 2.5 clock cycles of source clock signal 155, the duty cycle for the 80% clock frequency cannot be 50-50. However, all the remaining decreased (stepped) clock frequencies correspond to a 50-50 clock cycle. For example, the period of the 66.7% clock signal equals 3 cycles of source clock signal 155 so the rising and falling edges for the 66.7% clock signal are each separated by 1.5 periods for source clock signal 155. Similarly, the period for the 50% clock signal equals four cycles of source clock signal 155 so that the rising and falling edges for the 50% clock signal are separated by two cycles of source clock signal 155. The period for the 40% clock signal equals five cycles of source clock signal 155 so that the rising and falling edges for the 40% clock signal are separated by 2.5 cycles of source clock signal 155. Similarly, the period for the 33.3% clock signal (6 cycles of source clock signal 155), the period for the 25.0% clock signal (8 cycles of source clock signal 155), and the period for the 16.7% clock signal (12 cycles of source clock signal 155) all equal a whole number of cycles of the source clock signal 155 so that their duty cycles are 50-50. It will be appreciated that source clock signal 155 need not be over-clocked at twice the frequency of $F_{MAX}$ but may instead be clocked at other even multiples of $F_{MAX}$ (e.g, four times, eight times, etc.). Moreover, these alternative over-clocking frequencies allow clock divider 110 to achieve alternative clock divisions besides just the percentages shown in FIGS. 2A and 2B. These various clock frequency percentages are all instantiations of processor clock signal 145.

Referring again to FIG. 1, GPU 115 includes an activity predictor (dI/dt) 120 that alerts system 100 regarding any upcoming increases in load demand by its MACs. For example, activity predictor 120 may predict imminent increases in load demand by examining the operation code (opcode) that will be executed by the MACs. As illustrated, activity predictor 120 is implemented through software running on GPU 115 but it will be appreciated that dedicated hardware may also be used to form the activity predictions. In the following discussion, it will be assumed that the activity predictions from activity predictor 120 are digital activity codes that map to a particular integer value for the numerator N used in the N/M division performed by clock divider 110. As noted earlier, only certain ones of the divided clock signals from clock divider 110 that are used to form processor clock signal 145 actually correspond to integer values for N if the divisor M is assumed to equal forty-eight. But it is a useful model to assume that the clock division corresponds to a division by the ratio N/M formed by integers N and M. With regard to a value of M equaling forty-eight, the 100% clock signal corresponds to a value of N equaling twenty-four. An activity code for the default mode of operation would thus map to a value of N equaling twenty-four. In such an implementation, there may thus be twenty-three other activity codes that would map to reduced values of N ranging from twenty-three all the way down to one.

But keeping PLL 105 locked such that processor clock signal 145 is synchronous with source clock signal 155 allows for only certain values of stepped clock frequencies. For example, the percentages of FIGS. 2A and 2B discussed above provide for just seven stepped down clock frequencies ranging from the 80% clock signal to the 16.7% clock signal. System 100 thus includes a controller 160 that is configured to respond to the activity codes to command clock divider 110 to output one of the stepped clock signals thus quantizes the various activity codes from activity predictor 120. Such a quantizing is effectively a quantizing of the multiple of the default number of active MACs to a quantized value. To perform the mapping between the increased load identified by the activity codes and the corresponding reduced clocking frequency, controller 160 includes a look-up table (LUT) 125. It will be appreciated that a software-based mapping may be performed in alternative implementations. LUT 125 also includes a logic circuit that quantizes the various load levels into the reduced frequencies discussed with regard to FIGS. 2A and 2B. For example, the 80% clocking frequency corresponds to a load increase of 1.25 times as many MAC units being used in each clock cycle as compared to the MAC usage in the default mode of operation. Similarly, the 66.7% clock frequency corresponds to a load increase of 1.5 times as many MAC units being used as compared to the usage in the default mode of operation. LUT 125 may thus quantize by mapping minor increases in load to the default clocking frequency of $F_{MAX}$. For example, LUT 125 may quantize all activity codes that correspond to an initial minor load range of 1.0 to 1.125 times the default number of MAC units to the default clocking frequency of $F_{MAX}$. A first significant load range such as from 1.125 to 1.375 times the default MAC usage may be mapped by LUT 125 to the 80% clocking frequency. The entire expected range of MAC usage increase may thus be quantized and mapped in this fashion to a corresponding reduced clocking frequency. LUT 125 then commands clock divider to achieve the appropriate clock division. The resulting change in current draw dI/dt from power rail 150 as GPU 115 transitions from the default mode of operation to an increased load mode of operation will thus be substantially zero. In particular, the change in current draw dI/dt will equal zero should the MAC usage increase correspond exactly to the 1.25, 1.5, 2.0, 3.0, 4.0, and 6.0 multiples of the default number of MAC units that are discussed with regard to FIGS. 2A and 2B. But the change in current draw dI/dt will still be substantially zero if the MAC usage increase is instead skewed with regard to these exact multiples as quantized through LUT 125.

In one implementation, controller 160 may be deemed to comprise a means for quantizing the multiple of the default number of the MAC units to a quantized value and for mapping the quantized value into a reduced clock frequency that is inversely proportional to the quantized value and to further comprise a means for controlling clock divider 110 so that the divided frequency equals $f_{MAX}$ while GPU 115 is configured to operate in the default mode of operation and so that the divided frequency equals the reduced clock frequency while the GPU 115 is configured to transition from the default mode of operation into the increased load mode of operation.

Figure 3:
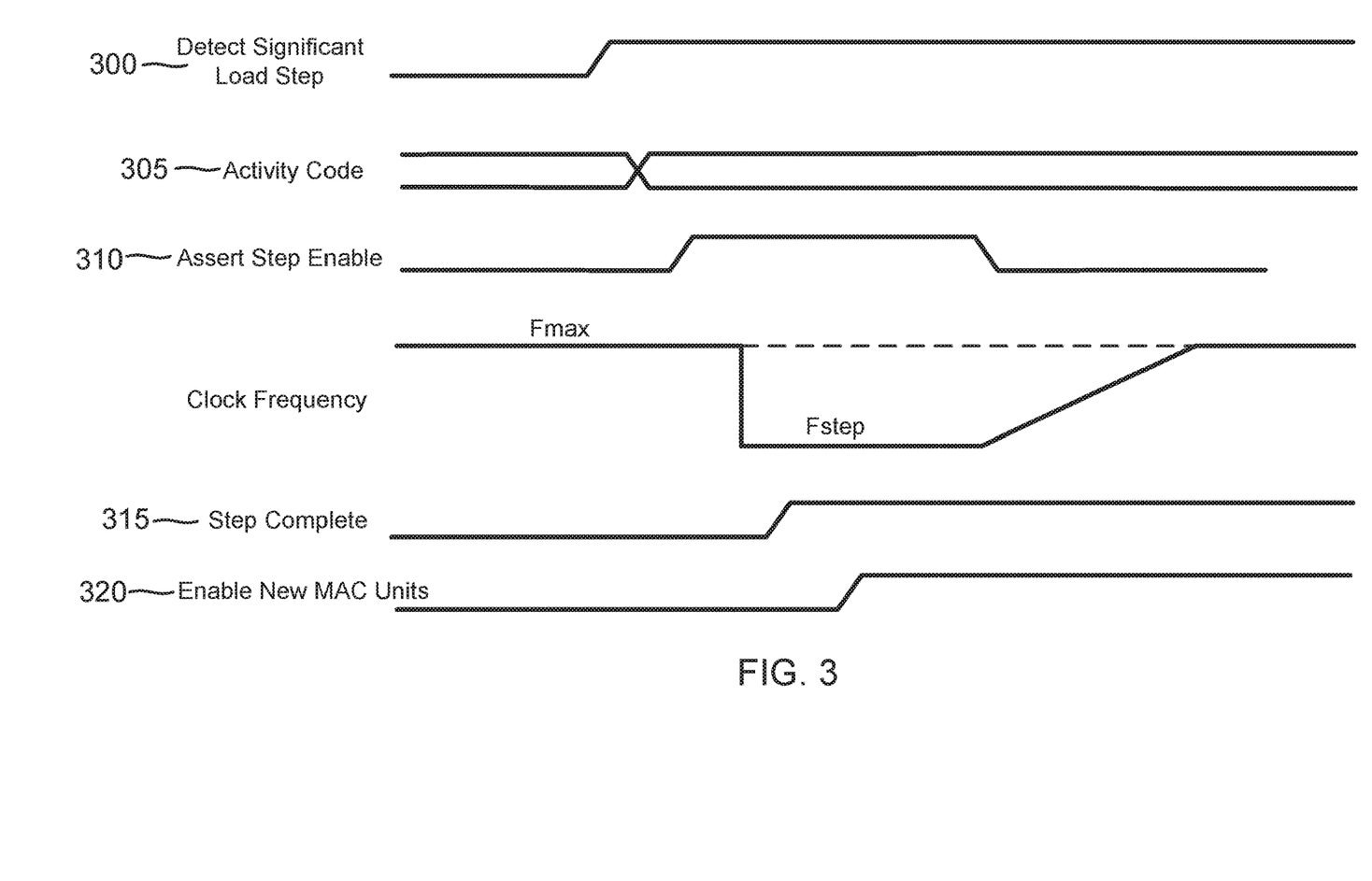
FIG. 3 illustrates some signal waveforms for the processor system of FIG. 1 in accordance with an aspect of the disclosure.

Some example signal waveforms for system 100 are shown in FIG. 3 with regard to the transition from the default mode of operation to an increased load mode of operation. In particular, activity predictor 120 (FIG. 1) may assert a significant load step signal 300 should the load increase be greater than the initial minor load range discussed above. In particular, there is an initial minor load range from the 1× multiple of the default number of active MAC units to some slightly increased multiple such as 1.125. Load increases falling within this initial minor range are not significant enough to trigger a clock division since the increase in load is relatively minor. Thus, activity predictor 120 may be configured to assert a significant load step signal 300 only when the load increase is such that the multiple of the default number of active MAC units is above this initial minor range. An activity code 305 changes in conjunction with the assertion of significant load step signal 300. LUT 125 of system 100 maps the change in activity code 305 to a stepped clock frequency designated as Fstep in FIG. 3 such that the clocking frequency or clocking rate of GPU 115 is dropped from $F_{MAX}$ to the Fstep frequency. Controller 160 asserts a step complete signal 315 after the clocking frequency is dropped whereupon a set 320 of additional MAC units are enabled in the increased load mode of operation.

But note that a power source such as PMIC 135 can respond to the increased current demand that would result from increasing the load while GPU 115 is clocked at the maximum frequency FMAX so long as the change in load is gradual as opposed to the sudden load transition addressed by controller 160 and clock divider 110. Controller 160 is thus configured to gradually increase the clocking frequency following the transition period while GPU 115 is clocked at the stepped clock frequency. For example, activity predictor 120 (or some other suitable source) may assert a step enable signal 310 while clock divider 110 should apply the appropriate frequency step division during the transition period from the default mode of operation to the increased load mode of operation. When step enable signal 310 is again de-asserted, controller 160 (such as through LUT 125) commands clock divider 110 to begin ramping the clock frequency back to the maximum frequency $F_{MAX}$. But as discussed with regard to FIGS. 2A and 2B, there is only a finite set of reduced clock frequencies that may be synchronously produced from an overclocked source such as source clock signal 155. The ramping of frequency thus is not analog but instead involves a stepping up from the reduced clock frequency through any intervening reduced clock frequencies from the finite set of reduced clock frequencies until the maximum frequency $F_{MAX}$ is reached.

For example, suppose processor clock signal 145 is stepped to cycle at the 50% clock frequency. In response to the de-assertion of step enable signal 310 at the end of the transition period, controller 160 may then command clock divider 110 to increase the clock frequency to the 66.7% clock frequency for a first number of cycles and then to increase to the 80% clock frequency for a second number of cycles. Finally, controller 160 would increase the clock frequency to $F_{MAX}$ for a third number of cycles before the ramping frequency increase is deemed to be complete.

Figure 4:
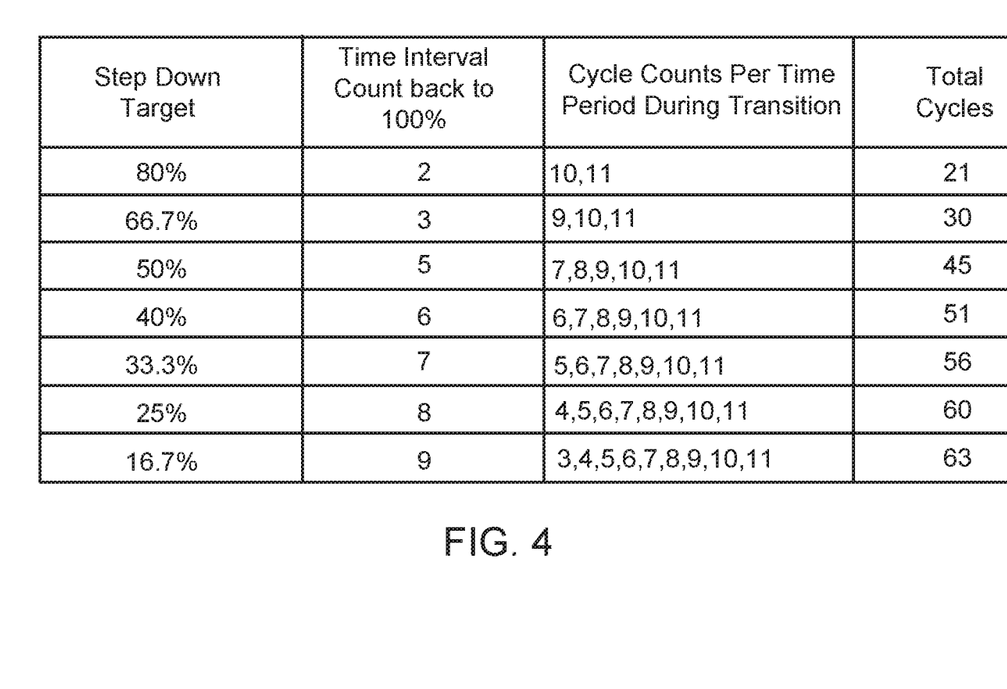
FIG. 4 is a table of clocking parameters for the transition from the stepped frequency back to the maximum clocking frequency for the processor system of FIG. 1 in accordance with an aspect of the disclosure.

The resulting control of the frequency for processor clock signal 145 is quite advantageous as the clocking frequency is deterministically known at all times during the transition period and also during the ramping back up period. Other processes in GPU 115 may thus benefit from this deterministic knowledge of the clocking frequency. For example, consider the table shown in FIG. 4 for the finite set of stepped clock frequencies discussed with regard to FIGS. 2A and 2B. Each step down frequency target corresponds to a time interval count back to the 100% ($F_{MAX}$) frequency. The time interval count corresponds to how many different stepped frequencies (including $F_{MAX}$) are utilized during the transition and ramping back periods. For example, the 80% clock frequency is the initial stepped down frequency from $F_{MAX}$. The time interval count is thus 2 because the clock frequency will first be stepped to 80% for the transition period and then increased again to 100% during the ramping up period. But the number of cycles for processor clock signal 145 at each distinct stepped frequency (including the 100% frequency during the ramp back period) is known. For example, processor clock signal 145 will cycle a first predetermined number of periods equaling 10 periods upon stepping down to the 80% clock frequency. It will then cycle for a second predetermined number of periods equaling 11 periods at the 100% clock frequency to complete the ramping back period to achieve the maximum clocking frequency $F_{MAX}$. In this fashion, the clock frequency is deterministically determined at all times during the stepped down period and also during the ramping back period. To keep the transition period approximately the same for all the various different load increases, the number of clock periods is reduced for the stepped period as the clock period is slowed. For example, the stepped period at the 16.7% clock frequency is just 3 cycles. It will be appreciated that the cycle numbers shown in FIG. 4 are merely representative and may be varied in alternative implementations. The increase in load for GPU 115 that maps to the 80% clocking frequency may be designated as a first increased load mode of operation. Similarly, the increase in load for GPU 115 that maps to the 66.7% clocking frequency may be designated as a second increased load mode of operation, and so on.

Referring again to FIG. 1, note that other processes may also instruct clock divider 110 to change the frequency of processor clock signal 145. An arbitrator 130 in controller 160 is thus configured to arbitrate between the load step balancing frequency changes discussed herein and alternative techniques to adjust the clocking frequency. For example, an existing clock management technique may be denoted as limits management hardware (LMH) as issued from an LMH requestor 165 implemented through software on GPU 115. Arbitrator 130 may be configured to give priority to the load step balancing requests from activity predictor 120 as opposed to LMH requests from LMH requestor 165. Should only an LMH request be active, LUT 125 may map the LMH command into a certain value N for the N/M division by clock divider 110. As discussed above, clock divider 110 cannot achieve arbitrary values for the ratio N/M but instead produces only the finite set of reduced clock frequencies discussed herein. But clock divider 110 may mimic the desired values for N and M as commanded by a particular LMH setting by dithering between appropriate frequencies from the finite set of reduced clock frequencies. For example, suppose M is 48 and N is 18. The resulting ratio (18/48) cannot be achieved by clock divider 110 since it can only respond to edges of source clock signal 155. But clock divider 110 can synchronously step down the frequency to the 80% clock frequency and also to the 66.7% clock frequency. Thus, clock divider 110 can approximate the N/M ratio of 18/48 by an appropriate dithering between the 80% clock frequency and the 66.7% clock frequency. In this fashion, clock divider 110 may approximate any desired value of N/M as N is reduced from its value at $F_{MAX}$ (which is 24 if M is 48) all the way to 1.

Figure 5:
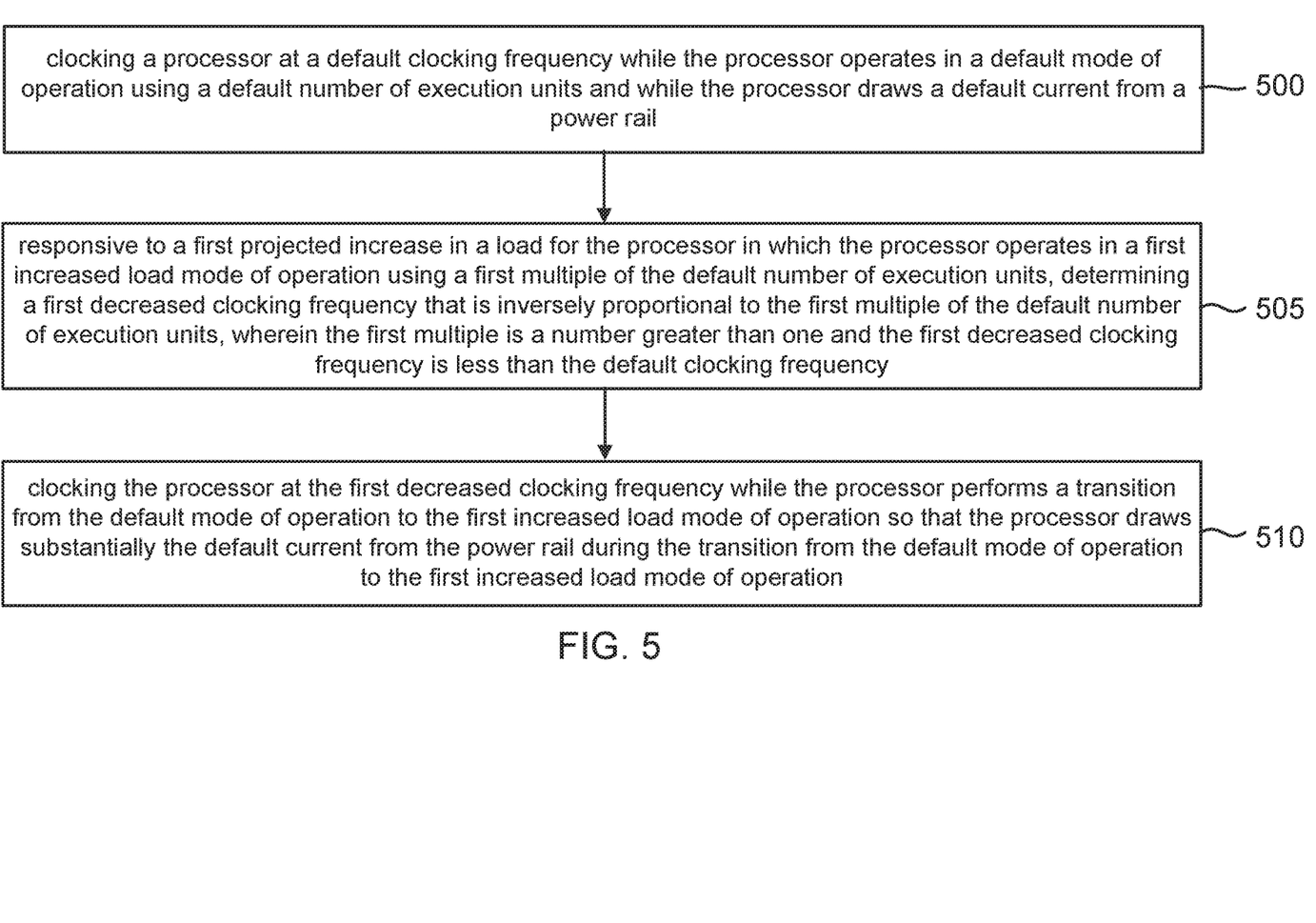
FIG. 5 is a flowchart for an example load step balancing method that maintains the power supply voltage for a processor despite a sudden and significant load increase in accordance with an aspect of the disclosure.

An example method of load step balancing will now be discussed with regard to FIG. 5. The method includes an act 500 of clocking a processor at a default clocking frequency while the processor operates in a default mode of operation using a default number of execution units and while the processor draws a default current from a power rail. The operation of GPU 115 in the default mode of operation prior to a significant load increase in an example of act 500. The method also includes an act 505 that is responsive to a projected increase in processor load in which the processor operates in an increased load mode of operation using a first multiple of the default number of execution units and includes determining a first decreased clocking frequency that is inversely proportional to the first multiple of the default number of execution units, wherein the first multiple is a number greater than one and the first decreased clocking frequency is less than the default clocking frequency. The mapping within LUT 125 of a load increase to a reduced clocking frequency is an example of act 505. Finally, the method includes an act 515 of clocking the processor at the first decreased clocking frequency while the processor performs a transition from the default mode of operation to the first increased load mode of operation so that the processor draws substantially the default current from the power rail during the transition from the default mode of operation to the first increased load mode of operation. The transition of GPU 115 to an increased load mode of operation while being clocked at a reduced clocking frequency such as from the finite set of reduced clocking frequencies discussed with regard to FIGS. 2A and 2B is an example of act 515.

It will be appreciated that many modifications, substitutions and variations can be made in and to the materials, apparatus, configurations and methods of use of the devices of the present disclosure without departing from the scope thereof. In light of this, the scope of the present disclosure should not be limited to that of the particular implementations illustrated and described herein, as they are merely by way of some examples thereof, but rather, should be fully commensurate with that of the claims appended hereafter and their functional equivalents.

We claim:

1. A method, comprising:
    clocking a processor at a default clocking frequency while the processor operates in a default mode of operation using a default number of execution units and while the processor draws a default current from a power rail;
    responsive to a first projected increase in a load for the processor in which the processor operates in a first increased load mode of operation using a first multiple of the default number of execution units, determining a first decreased clocking frequency that is inversely proportional to the first multiple of the default number of execution units, wherein the first multiple is a number greater than one and the first decreased clocking frequency is less than the default clocking frequency; and
    clocking the processor at the first decreased clocking frequency while the processor performs a transition from the default mode of operation to the first increased load mode of operation so that the processor draws substantially the default current from the power rail during the transition from the default mode of operation to the first increased load mode of operation.

2. The method of claim 1, further comprising:
    generating a first processor clock signal to cycle at the default clocking frequency so that edges of the first processor clock signal are synchronous with edges of a source clock signal, wherein clocking the processor at the default clocking frequency comprises clocking the processor with the first processor clock signal, and wherein a frequency of the source clock signal is an integer multiple of the default clocking frequency; and
    generating a second processor clock signal to cycle at the first decreased clocking frequency so that edges of the second processor clock signal are synchronous with edges of the source clock signal, wherein clocking the processor at the first decreased clocking frequency comprise clocking the processor with the second processor clock signal.

3. The method of claim 2, further comprising:
    generating the source clock signal in a phase-locked loop, wherein the phase-locked loop remains locked while the processor transitions from the default mode of operation to the first increased load mode of operation.

4. The method of claim 2, wherein clocking the processor with the second processor clock signal while the processor transitions from the default mode of operation to the first increased load of operation comprises clocking the processor at the first decreased clocking frequency for a first predetermined number of periods of the second processor clock signal.

5. The method of claim 4, further comprising: following the first predetermined number of periods for the second processor clock signal, clocking the processor with the first processor clock signal for a second predetermined number of periods for the first processor clock signal.

6. The method of claim 1, further comprising:
    determining a set of multiples of the default number of execution units, wherein the set of multiples ranges across an expected range of usage of the execution units for the processor;
    responsive to a second projected increase in processor load in which the processor operates in a second increased load mode of operation using a second multiple of the default number of execution units, quantizing the second multiple to a corresponding multiple from the set of multiples of the default number of execution units;
    mapping the corresponding multiple to a second reduced clocking frequency that is inversely proportional to the corresponding multiple; and
    clocking the processor at the second reduced clocking frequency as the processor transitions from the default mode of operation to the second increased mode of operation.

7. The method of claim 6, wherein the mapping the corresponding multiple comprises mapping the corresponding multiple through a lookup table.

8. A system, comprising:
    a clock source for providing a source clock signal having a source clock frequency;
    a clock divider configured to divide the source clock signal into a processor clock signal having a divided frequency;
    a processor including a plurality of execution units, wherein the processor is configured to operate in a default mode of operation in which the processor uses a default number of the execution units from the plurality of execution units to be clocked in each cycle of the processor clock signal and to operate in an increased load mode of operation in which the processor uses a multiple of the default number of the execution units to be clocked in each cycle of the processor clock signal, wherein the processor is further configured to assert an activity code to predict a transition from the default mode of operation to the increased load mode of operation; and
    a look-up table configured to map the activity code to a first command for the reduced frequency, and wherein the clock divider is configured to respond to the first command for the reduced frequency so that the divided frequency of the processor clock signal equals a reduced frequency that is inversely proportional to the multiple of the default number of execution units while the processor is configured to perform the transition from the default mode of operation to the increased load mode of operation.

9. The system of claim 8, wherein the clock source comprises a phase-locked loop configured to remain locked while the processor is configured to perform the transition from the default mode of operation to the increased load mode of operation.

10. The system of claim 8, wherein the system comprises a system-on-a-chip (SoC).

11. The system of claim 8, wherein the processor comprises a graphics processing unit (GPU) and wherein the plurality of execution units comprises a plurality of multiply-and-accumulate (MAC) units.

12. The system of claim 8, further comprising:
a power source configured to regulate a power supply voltage on a power rail, wherein the processor is further configured to draw a default current from the power rail while the processor operates in the default mode of operation, and wherein the processor is further configured to substantially draw the default current from the power rail while the processor is configured to perform the transition from the default mode of operation to the increased load mode of operation.

13. The system of claim 8, wherein the system comprises a system-on-a-chip (SoC).

14. A system, comprising:
a clock source for providing a source clock signal having a source clock frequency;
a clock divider configured to divide the source clock signal into a processor clock signal having a divided frequency; and
a processor including a plurality of execution units, wherein the processor is configured to operate in a default mode of operation in which the processor uses a default number of the execution units from the plurality of execution units to be clocked in each cycle of the processor clock signal and to operate in an increased load mode of operation in which the processor uses a multiple of the default number of the execution units to be clocked in each cycle of the processor clock signal, wherein the processor is further configured to assert an activity code to predict a transition from the default mode of operation to the increased load mode of operation and to map the activity code to a first command for the reduced frequency, and wherein the clock divider is configured to respond to the first command for the reduced frequency so that the divided frequency of the processor clock signal equals a reduced frequency that is inversely proportional to the multiple of the default number of execution units while the processor is configured to perform the transition from the default mode of operation to the increased load mode of operation.

15. The system of claim 14, wherein the clock source comprises a phase-locked loop configured to remain locked while the processor is configured to perform the transition from the default mode of operation to the increased load mode of operation.

* * * * *